United States Patent
Hehn et al.

(10) Patent No.: US 10,925,071 B2
(45) Date of Patent: Feb. 16, 2021

(54) METHOD FOR ADJUSTING THE INTERFERENCE LEVEL FOR A WIRELESS COMMUNICATION FROM A FIRST MOBILE STATION TO A SECOND MOBILE STATION AND ADAPTED MOBILE STATION FOR USE IN THE METHOD AND ADAPTED VEHICLE

(71) Applicant: VOLKSWAGEN AG, Wolfsburg (DE)

(72) Inventors: Thorsten Hehn, Wolfsburg (DE); Ernst Zielinski, Bochum (DE); Steffen Schmitz, Wesel (DE); Andreas Kwoczek, Lehre (DE); Teodor Buburuzan, Braunschweig (DE); Roman Alieiev, Stendal (DE)

(73) Assignee: Volkswagen AG

( * ) Notice: Subject to any disclaimer, the term of this patent is extended or adjusted under 35 U.S.C. 154(b) by 0 days.

(21) Appl. No.: 15/851,798

(22) Filed: Dec. 22, 2017

(65) Prior Publication Data
US 2018/0199349 A1    Jul. 12, 2018

(30) Foreign Application Priority Data
Jan. 11, 2017    (EP) .................................... 17150964

(51) Int. Cl.
*H04W 8/00*    (2009.01)
*H04W 72/04*    (2009.01)
(Continued)

(52) U.S. Cl.
CPC ........ *H04W 72/082* (2013.01); *H04B 7/0617* (2013.01); *H04W 8/005* (2013.01);
(Continued)

(58) Field of Classification Search
CPC . H04W 72/082; H04W 8/005; H04W 72/046; H04W 72/048; H04W 74/0816; H04W 84/005; H04B 7/0617
See application file for complete search history.

(56) References Cited

U.S. PATENT DOCUMENTS 6,320,538 B1 *  11/2001  Lalezari ................. H01C 3/267
                                                                    342/368
7,315,239 B2 *  1/2008   Cheng ................... B60W 40/04
                                                                    340/436
(Continued)

OTHER PUBLICATIONS

Luo et al.: Fundamental Analysis of a Car to Car Visible Light Communication System; 9th International Symposium on Communication Systems, Networks & Digital Sign; 2014; pp. 1011-1016.
(Continued)

*Primary Examiner* — Huy D Vu
*Assistant Examiner* — Bailor C. Hsu
(74) *Attorney, Agent, or Firm* — Barnes and Thornburg LLP (57) ABSTRACT

A method for adjusting the interference level for a wireless communication from a first mobile station to a second mobile station including detecting an interference level at a transmitting station and providing for elevation of the direction of beam for the signal transmissions from the first mobile station to the second mobile station relative to an angle between the ground plane and the current direction of beam for the transmissions from the first mobile station to the second mobile station. Such lifting up of the beam avoids interference at the place of a third mobile station located at the direction of signal transmission but with further distance, since the signal strength then vanishes relatively quickly if the beam is lifted up.

19 Claims, 4 Drawing Sheets

(51) Int. Cl.
*H04W 72/08* (2009.01)
*H04B 7/06* (2006.01)
*H04W 74/08* (2009.01)
*H04W 84/00* (2009.01)

(52) U.S. Cl.
CPC ....... *H04W 72/046* (2013.01); *H04W 72/048* (2013.01); *H04W 74/0816* (2013.01); *H04W 84/005* (2013.01)

(56) References Cited

U.S. PATENT DOCUMENTS

| | | | | |
|---|---|---|---|---|
| 7,363,117 | B2* | 4/2008 | Tengler | G01C 21/26 340/903 |
| 7,672,221 | B2* | 3/2010 | Fuji | H04L 25/0206 370/206 |
| 8,446,571 | B2* | 5/2013 | Fiess | G01S 17/42 356/3.01 |
| 8,488,525 | B2* | 7/2013 | Kawasaki | H04W 88/06 370/328 |
| 8,514,825 | B1* | 8/2013 | Addepalli | H04W 4/046 370/338 |
| 8,571,125 | B2* | 10/2013 | Maru | H04L 25/0242 375/267 |
| 8,780,964 | B2* | 7/2014 | Subramanian | H04J 11/0023 370/276 |
| 8,812,227 | B2* | 8/2014 | Carlson | B61L 15/0027 701/300 |
| 9,123,993 | B2* | 9/2015 | Schrabler | H01C 9/28 |
| 9,439,121 | B2* | 9/2016 | Barreto De Miranda Sargento | H04W 36/14 |
| 9,500,747 | B2* | 11/2016 | Inomata | G01C 22/02 |
| 10,365,350 | B2* | 7/2019 | Kamo | G01S 7/417 |
| 2004/0048635 | A1 | 3/2004 | Goldberg | |
| 2007/0090991 | A1* | 4/2007 | Yoshikawa | G01S 13/60 342/70 |
| 2010/0234071 | A1 | 9/2010 | Shabtay et al. | |
| 2011/0032149 | A1 | 2/2011 | Leabman | |
| 2012/0077430 | A1 | 3/2012 | Stuebing et al. | |
| 2016/0277911 | A1 | 9/2016 | Kang et al. | |
| 2018/0075746 | A1* | 3/2018 | Jiang | H04W 84/005 |
| 2018/0351606 | A1* | 12/2018 | Uchida | H04B 7/046 |

OTHER PUBLICATIONS

Wikipedia; Sinc function; downloaded from https://en.wikipedia.org/wiki/Sinc_function; Jan. 10, 2017.

* cited by examiner

METHOD FOR ADJUSTING THE INTERFERENCE LEVEL FOR A WIRELESS COMMUNICATION FROM A FIRST MOBILE STATION TO A SECOND MOBILE STATION AND ADAPTED MOBILE STATION FOR USE IN THE METHOD AND ADAPTED VEHICLE

PRIORITY CLAIM

This patent application claims priority to European Patent Application No. 17150964.9, filed 11 Jan. 2017, the disclosure of which is incorporated herein by reference in its entirety.

SUMMARY

The disclosure relates to a method for adjusting the interference level for a wireless communication from a first mobile station to a second mobile station. The disclosure further relates to a mobile station adapted for the use in the method and an adapted vehicle.

BRIEF DESCRIPTION OF THE DRAWINGS

An exemplary embodiment of the present disclosure is shown in the drawing and is explained in greater detail in the following description. In the drawings.

DETAILED DESCRIPTION

For the scenario of vehicles equipped with wireless communication modules that communicate directly with each other on public roads, either for a cooperative or autonomous driving scenario, a very high reliability is very important. Techniques for vehicle-to-vehicle direct communication have been developed and will be further developed. As an example the direct vehicle communication via WLAN may be mentioned. Especially the variation according to the WLAN standard IEEE 802.11p is suitable for this purpose. For communication between vehicles ad hoc wireless networks are set up (Communication in the "Ad Hoc domain") according to this technique.

But also vehicle communication is possible in the field of mobile networks. In this technique, however, the base station needs to convey the messages from vehicle to vehicle. This is the area where the communication in the so-called "Infrastructure domain" takes place. For the next generation of mobile communications, the vehicle-to-vehicle direct communication (V2V) is made possible. When Long Term Evolution (LTE) technology is concerned, this variation is named LTE V (for vehicle).

Sometimes the technologies for vehicle-to-vehicle direct communication are generally called device-to-device communication (D2D) or car-to-car communication (C2C). This is also the range of the vehicle communication with which the present disclosure is concerned.

Typical communication scenarios are safety scenarios, traffic efficiency and infotainment scenarios. In the safety area, the following example scenarios are called: "Cooperative Forward Collision Warning", "Pre-Crash Sensing/Warning", "Hazardous Location Warning". In these areas, the vehicles will exchange information with each other, such as position, movement direction and speed, and parameters such as size and weight. Other information important for the transfer is, e.g., intent information, such as "vehicle intends to overtake", "vehicle turns left/right", and so forth that are interesting for the cooperative driving. Here, often sensor data are transferred. If a hazard is present and the driver does not react, the car could automatically slow down, so that an accident is prevented or at least the consequences of the inevitable accident are minimized.

In the field of traffic management it is mentioned: "Enhanced Route Guidance and Navigation", "Green-Light Optimal Speed Advisory", "V2V Merging Assistance" and "Platooning" as examples. Platooning is understood to be the intelligent driving of a group of vehicles in a convoy as an application, which is also known as "high density platooning". In this case, the distances between the vehicles of the column are controlled, e.g., Trucks in the respective traffic situation. The aim is to reduce the distance between the column vehicles as much as possible to reduce energy consumption. In the area of "platooning", it is planned, for example, a reporting back of information about an intended braking maneuver from front to back to avoid rear-end collisions. To this end, messages must be constantly exchanged between the column vehicles.

In the field of Infotainment Internet access is most important for a plurality of multimedia services.

The listing shows that in the safety field time-critical data transmissions take place. Therefore, the latency of the vehicle-to-vehicle communication is crucial. Latency refers to the timely transmission of the data. The data must arrive at the receiver early enough so that they may still be processed and the receiver can react accordingly.

In mobile communications, the presence of interference of one communication process on another has a critical impact on communication performance. Within V2V communication this problem is even more pronounced due to the fact that most of the communicating partners are usually located on the same road in close proximity. Interference occurs if two or more signal transmissions are simultaneously performed and the signal strength is high enough that by the superposition of the signals at the receiver location the signal is falsified such that the transported data cannot be retrieved despite of the application of error detection and error correction codes. Therefore, there is a need for enhanced solutions to avoid interference.

Currently, there are different ways to minimize the problem of interference on a communication process.

In the case of centralized networks such as cellular systems with an eNodeB being a central entity, the problem is minimized by such allocation of available resources that at the same point in time, a given frequency at a given space may only be scheduled to one communication entity for transmission. On one side, the desired time, frequency and space separation in a dynamic environment is a very challenging task to solve. On the other side, it still limits utilization of the frequency-time resources to only one communication partner over the area where such transmission could cause a significant level of interference.

In the case of a decentralized communication where different stations compete to get access to the network and there is an arbitration phase defined where it will be determined which station gets the right to access the network, the problem is even more significant. The Carrier Sense Multiple Access/Collision Avoidance CSMA/CA arbitration technique is used, e.g., in wireless networks such as WLAN networks. Since according to such technique the access to resources happens in an opportunistic manner there is always a probability that two parallel transmissions could interfere with each other. Besides this, the interference from a so-called hidden terminal may occur.

Besides the allocation of different resources to different users, the impact of interference can be reduced by reducing the area in space where the signal is distributed. The known approaches for it are the use of the Multiple Input Multiple Output (MIMO) antenna technique coupled with orthogonal channel components (special multiplexing, multiuser MIMO), beamforming (to form the beam in a known direction and to minimize the side lobes in the direction of other users) or via the use of knowledge about the special distribution of the signal in a given area (special frequency reuse).

The documents US2012077430A1 and US2010234071A1 are examples where the beamforming technique is used for the purpose to adapt the emission field of at least one transmission antenna in such a manner that a field strength of the electromagnetic waves is reduced at a location of the receiving device. Both partner stations transmitting station and receiving station are vehicles equipped with radio communication modules, the technique is therefore used for V2V communication.

Also US20160277911A1 discloses the use of a beamforming technique in a vehicle. A controller inside the vehicle controls a communication unit inside the car when an accident is predicted to occur to focus the beam pattern onto a peripheral vehicle and transmitting a request signal of accident associated information.

US20110032149A1 discloses a system and method for antenna optimization for a wireless broadband communication utilizing a beamforming technique which happens between an airplane and a base station on the ground.

US20040048635A1 discloses a wireless communication unit comprising at least one beamforming antenna which will be used for vertical beam steering for terrain adaptation to reach a terminal with minimum receiver interference.

All the aforementioned approaches are very complex and have limited performance in a dynamic vehicular environment with heavy traffic.

Another known quite simple approach is to dynamically adapt the transmit power if the sufficient reception of the signal can be possible even with lower power. This concept does not contradict with any other approach and can be used in combination with them.

There is therefore a need for an improved solution to the interference problem which helps to avoid interference in a dynamic vehicular environment with heavy traffic. This solution shall be easy to implement without the need to implement complicated further error correction algorithms.

These are solved with a method for adjusting the interference level for a wireless communication from a first mobile station to a second mobile station, a corresponding adapted mobile station and adapted vehicle according to the independent claims.

The dependent claims contain developments and improvements to the method and devices (mobile station, and vehicle) according to the disclosure.

The solution according the proposal provides a relatively simple method to minimize interference, specifically in direct V2V communications. If the direct communication between two vehicles is expected to be conducted in a close proximity on the road with the presence of the line-of-sight (LOS) between two vehicles, then the sufficient perception level may be still achievable if the direction of the main beam is selected not parallel to the ground plane but with a certain angle in the vertical direction. Due to this angle, the distribution of the energy from the main lobe projected onto the ground plane will decrease much faster compared to the case, when the signal is radiated with such an angle that the main beam is substantially parallel to the ground plane.

In fact the solution according the proposal relates to a method for adjusting the interference level for a wireless communication from a first mobile station to a second mobile station, comprising an operation of detecting an interference level. This method is characterized in that, the direction of beam for the signal transmissions from the first mobile station to the second mobile station is elevated relative to an angle between the ground level and the current direction of beam for the transmissions from the first mobile station to the second mobile station. This has the benefit, that by elevating the beam, the third (vertical) dimension of space is exploited. This form of beam steering in vertical direction is very beneficial for the short distance communication.

The proposed method also allows for a dynamic adaptation of the interference level for the communication to other mobile stations which results in an overall increase of resource utilization in the system. This method is easy to implement without the need for sophisticated research and development work.

The proposal is useful for V2V communication, i.e., in a dynamic vehicular environment with heavy traffic.

The typical situation where the solution can be applied is when a second vehicle is moving in front of a first vehicle and a third vehicle is moving in front of the second vehicle. In that situation the interference level caused from the signal radiation of the first vehicle perceived at the location of the third vehicle will be drastically reduced.

This interference level reduction can be further accelerated, if the direction of beam emitted from the first vehicle is steered downward to the road surface such that due to the reflection of the beam at the road surface the direction of beam is indirectly elevated. By introducing the beam direction adjustment by ground reflection it is possible to maintain the angle towards vertical direction for variable distances in longitudinal and lateral directions. Therefore, by varying the ground reflection distance the signal energy and thus the interference level can also be adjusted. The ground reflection solution thus introduces another degree of freedom such that overall we have a multi-dimensional solution (x,y,z direction+ground-reflection distance) for adjusting the signal energy resp. the interference level.

The reflection-based approach further provides more flexibility in placing the antenna module AM and has the benefit that the signal will be reduced in power by the reflection per se and thus the interference reduction is faster achieved with beam-steering.

For the proposed reflection-based method of beam steering, the antenna placement in the car is more relaxed compared to conventional vertical beam steering and can be better suited to strict design requirements of the car manufacturer.

For the operation of detecting the interference level there is no need for an additional implementation of this operation since interference detection is anyhow needed as part of the CSMA/CA technique during an operation of wireless network arbitration.

In the field of V2V communication, the presence of a third vehicle may be detected by the exchange of cooperative awareness messages between the first second and/or third vehicle. Such cooperative awareness messages typically include the position of the vehicle sending out the cooperative awareness message. The position may be based on GPS data, GLONASS or Beidou data.

In at least one disclosed embodiment, the presence of a third vehicle may be detected by a sensor with which the first vehicle is equipped, in particular, camera sensor, RADAR sensor or LIDAR sensor. In some situations it may be difficult to detect the presence of the third vehicle with such sensors because it would be moving in front of the second vehicle and the first vehicle would have a direct line of sight to only the second vehicle.

The presence of a third vehicle may be detected by a sensor with which the second vehicle is equipped, in particular, camera sensor, RADAR sensor or LIDAR sensor, and wherein the recognition of the third vehicle is communicated from the second vehicle to the first vehicle.

A mobile station adapted for the use in the disclosed method may comprise a radio communication module for transmitting messages to a second mobile station and for receiving messages from the second mobile station and/or from a third mobile station. Further it may comprise at least one directional antenna for sending out a beam towards the second mobile station and more that, the mobile station further comprises a mechanism for elevating the direction of beam for the signal transmissions from the mobile station to the second mobile station relative to an angle between the ground level and the current direction of beam for the transmissions from the first mobile station to the second mobile station.

In at least one disclosed embodiment, the mobile station comprises a multi antenna array and the elevation of the direction of beam is performed with the help of a beamforming or beamsteering technique.

In another disclosed embodiment, the mobile station comprises a mechanism for elevating the directional antenna for the elevation of the direction of beam.

In a still further disclosed embodiment, the mobile station comprises a movable reflection mechanism and the movable reflection mechanism are adjusted so the direction of beam is elevated.

In a still further disclosed embodiment, the mobile station comprises a mechanism that turn down the direction of beam towards the ground level such that the beam will be reflected at the ground surface so that the reflected beam will be directed with a higher angle between the ground level and the direction of beam compared to the current direction of beam. Here, the elevation of the direction of beam is performed indirectly via reflection. The means for turning down the direction of beam towards the ground level can be of the same type as in the previous mentioned embodiments.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles and concepts of the disclosure and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the technique being selectable by the implementer as more specifically understood from the context.

In the claims hereof, any element expressed for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited mechanisms are combined and brought together in the manner which the claims call for. It is thus regarded that any mechanism that can provide those functionalities are equivalent to those shown herein.

Figure 1:
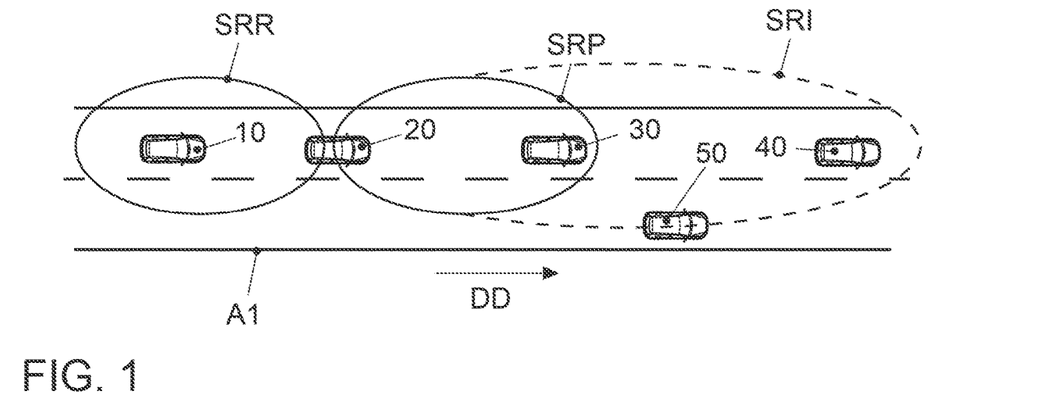
FIG. 1 shows the principle of direct car-to-car communication for cars driving on two lanes of a road.

FIG. 1 shows the principle of direct car-to-car communication. A first car 20 is driving on the fast lane of a road A1 with two lanes for one driving direction DD. A second car 30 is driving just in front of car 20. A third car 40 is driving in front of the second car 30 and a fourth car 10 is driving behind the first car 20. The third car 40 just has overtaken a fifth car 50 driving on the normal lane of road A1. The 1st car 20 is communicating with the 2nd car 30 in front direction and with the 4th car 10 in rear direction. The cars are equipped with communication module and one or more antenna module (not shown in FIG. 1). The communication module may be of the type of a WLAN p-Module. WLAN p is a standardized wireless communication system which has been specifically designed for C2C communication. The specification is retrievable under the number IEEE 802.11p. In the United States a frequency band between 5.85 to 5.925 GHz is reserved for the C2C communication based on WLAN p.

The transmission in front direction is performed with greater transmission power and is thus more problematic than the transmission in rear direction. In another disclosed embodiment the transmission is only in front direction or only in rear direction. The problem with the transmission in front direction is that the signal range extends much further in the front direction than needed for the successful communication to the second car 30. A signal range sufficient for the communication to the 2nd car 30 is labelled SRP. With dashed line, the actual signal range is depicted in FIG. 1. Such signal range is labelled SRI and as can be seen in FIG. 1 the signal range SRI extends up to the third car 40. The signal transmissions from the 1st car 20 thus will be perceived as interference at the location of the third car 40 and very likely also at the location of the fourth car 50. Thus the communications from and to the third car 40 and fourth car 50 might be disturbed. A signal range corresponding to SRP for the communication with the 5th car in rear direction is labelled SRP.

It is noted that the WLAN p specification includes a mandatory arbitration phase for starting a communication in which an operation of detecting the interference level is performed. This is part of the CSMA/CA technique on which the WLAN p standard relies.

In the field of V2V communication it is often the case in dense traffic that a third vehicle is driving in front of the second vehicle. That one will perceive interference. To avoid such interference problem it is required to detect the presence of the third vehicle. There are different ways to do this. The 1st car 20 can perform this task with the help of sensor detection. If the sensor is a camera, then by certain image processing technology with object recognition the presence could be detected. In an alternative disclosed embodiment another sensor could be used for the same purpose, such as Radar or Lidar sensor. In another disclosed embodiment the 2nd car 30 does the presence detection with its own sensors and communicates the information that a third car is present in a corresponding message to the 1st car 20. The message can be of the type of a cooperative awareness message CAM.

Figure 2:
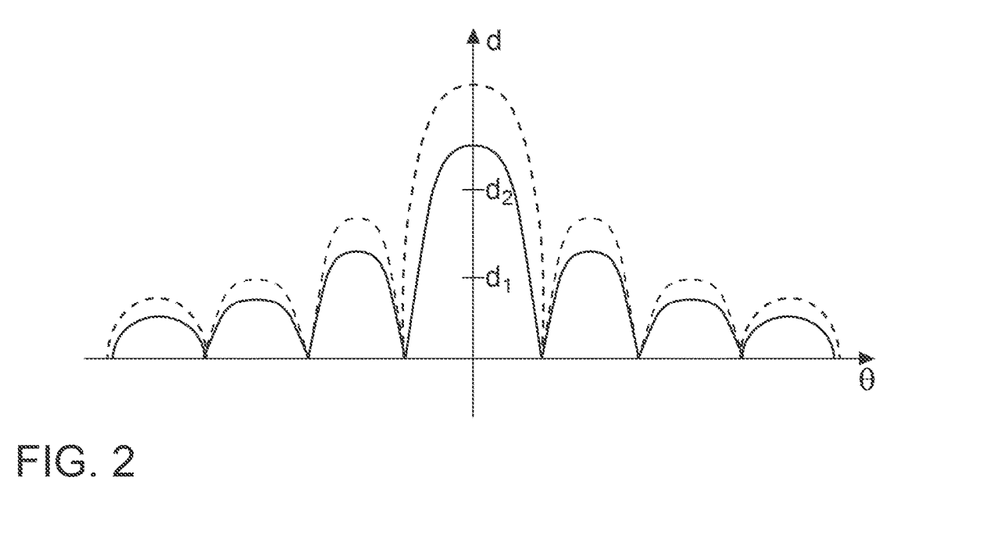
FIG. 2 shows a typical antenna diagram with main lobe and a plurality of side lobes.

FIG. 2 illustrates a typical antenna diagram for signal transmissions in an idealistic uniform linear array (ULA) antenna system with half-wavelength antenna separation for which the sinc-model is applicable. If we consider such an idealistic antenna system, as shown in FIG. 2, where the beam energy distribution follows the so-called "sinc"-model according to the formula $\sin(\Theta)/\Theta$, where $\Theta$ is the angle between the steered beam and the antenna array, then the received level of the signal according to Fourier-transformation principle between the relative antenna separation distance and spatial direction at some angle $\Theta$ will depend on the distance d to the antenna system and the curvature of the beam, the idealistic form of it is shown in FIG. 2. For further details to the "sinc"-model, please see, e.g., in "Probability and information theories, with applications to radar", Woodward, Phillip M., Pergamon Press, page 29, (1953) ISBN 0-89006-103-3, OCLC 488749777. It is also referred to further explanations on Wikipedia for the search term sinc-function, see under the link https://en.wikipedia.org/wiki/Sinc_function#cite_note-4.

It is seen in FIG. 2, that the antenna diagram consists of a main lobe in the center and a plurality of side lobes which decrease in intensity according to the $\sin(\Theta)/\Theta$ curve. For further details to the model it is referred to the "beamsteering" technology where a plurality of phase array antenna elements are lined up in an antenna system and where the resulting beam distribution can be varied by driving the antenna elements with different phases. With d1 in FIG. 2 the level of sufficient perception for the 2nd car 30 in distance d1 is marked. With d2 the distance to the 3rd car 40 is also marked. The figure then shows which level of energy is sufficient for a successful reception at what steering angle $\Theta$ and at what distance.

Figure 3:
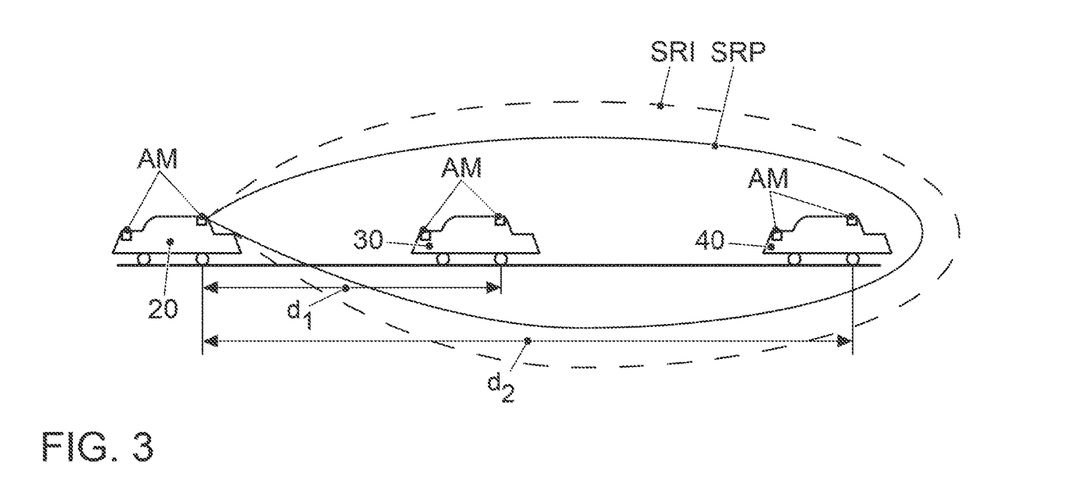
FIG. 3 illustrates the problem with interference in direct car communication in dense traffic if a plurality of cars is driving in the same direction on the same lane with short distance.

The beam direction for the usual case is in horizontal direction parallel to the ground level. This is illustrated in FIG. 3. As seen, the cars 20, 30, 40 are equipped with two antenna modules AM, one positioned at the front of the car and the other at the rear of the car. FIG. 3 shows the 1st car 20 communicating with 2nd car 30. With dashed line SRI the signal range where interference occurs is shown. The line SRP shows again the sufficient perception level range. This is the range where car communication should work as specified. The communication with the second car 30 which is a distance d1 away should be no problem since it is definitely inside the range SRP. However, the 3rd car 40 is also in that range and therefore could experience interference when 1st car 20 is communicating.

Figure 4:
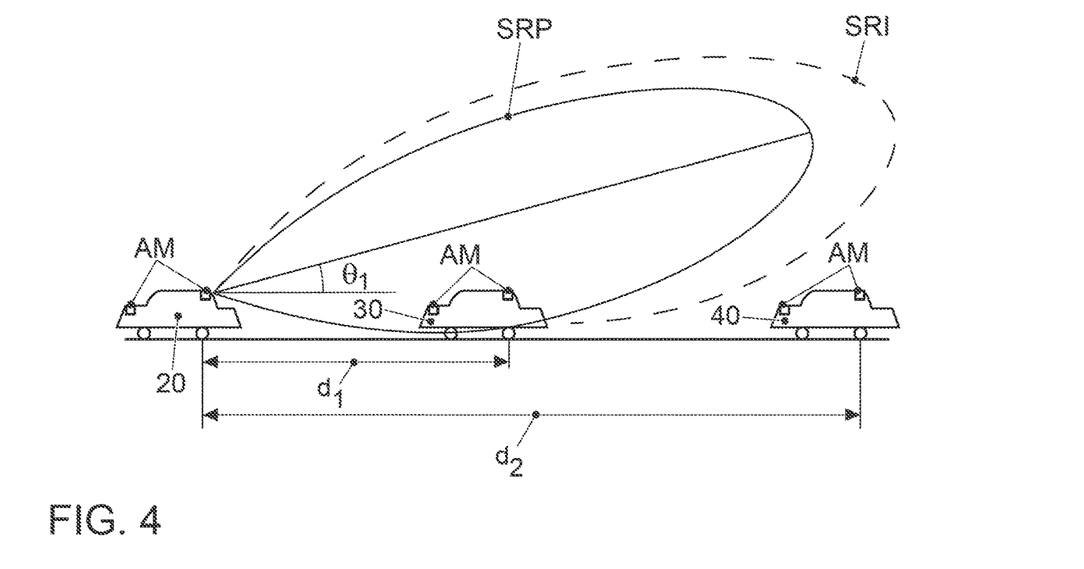
FIG. 4 illustrates a first embodiment for reducing the problem of interference in the scenario of FIG. 3.

FIG. 4 illustrates a first disclosed embodiment for a solution how to avoid this type of interference problem. This solution concerns the idea to steer the beam into the vertical direction with the angle $\Theta 1$ with beamsteering technology. A sufficient reception of the signal at the 2nd vehicle 30 due to the small distance d1 between 1st car 20 and 2nd car 30 is still possible, despite of the change of the direction of beam. At the same time the received signal level at the 3rd vehicle 40 for the same angle $\Theta 1$ will be much less not only because of the larger distance d2, but also due to the steering of the beam with angle $\Theta 1$ in vertical direction.

The steering of the beam into vertical direction can be done in different ways. One possible way is to use an adaptive beamforming technique. For this case the sufficient number of antennas has to be placed in a vertical direction in the antenna module AM on the vehicle. The design of the vehicle quite often limits this possibility.

Figure 5:
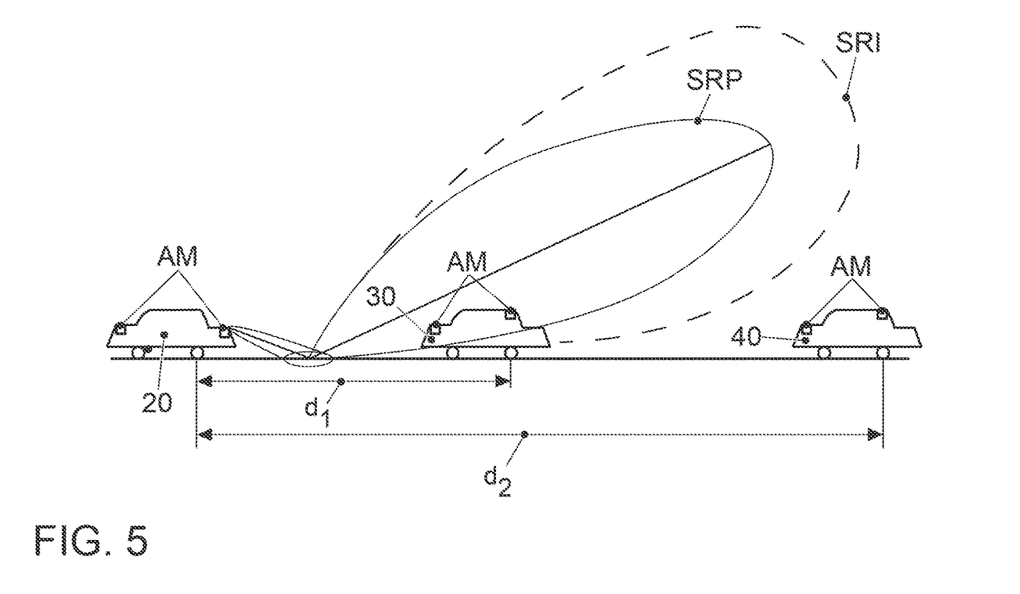
FIG. 5 illustrates a second embodiment for reducing the problem of interference in the scenario of FIG. 3.

FIG. 5 illustrates an alternative disclosed embodiment. In this disclosed embodiment the beam will be steered down in vertical direction to the ground. This can be done by placing an antenna module with multiple antennas at the bottom of the front of the vehicle such that they could steer down to the ground. Then due to the reflective properties of the road, the beam will be reflected and will follow the desired direction. In the second case, antennas can be placed in the lower part of the vehicle such as bumper or even under the vehicle (e.g., the front or rear suspension, a front or rear differential, etc.). Then by steering the beam down into the direction of the ground plane with a certain angle, the desired interference reduction can be achieved as in the first case but with a reflected wave. This disclosed embodiment provides more flexibility in placing the antenna module AM and provides that the interference reduction is faster achieved with the same steering technology due to the reflection at the road surface.

Figure 6:
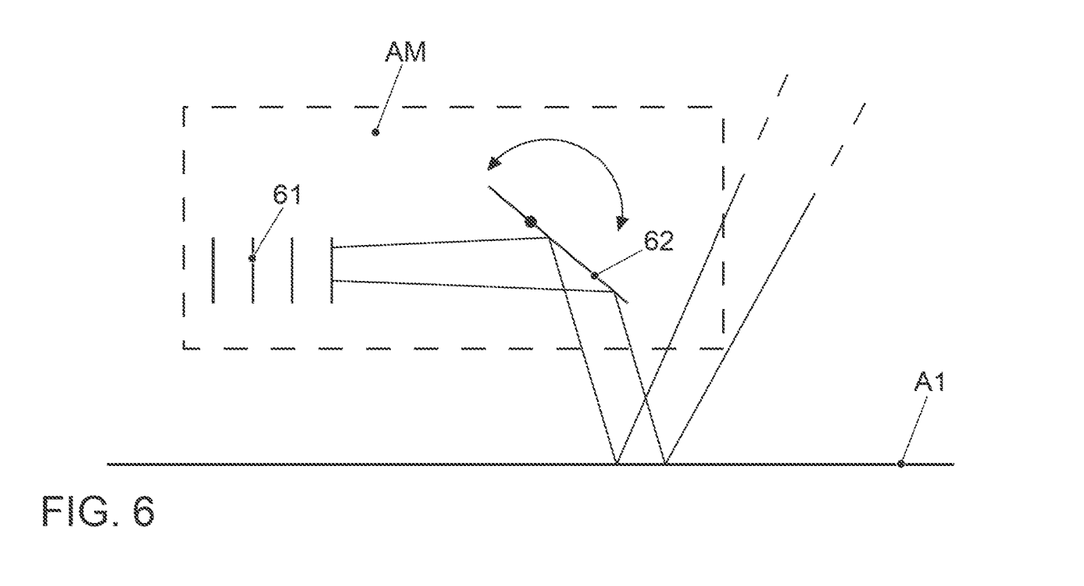
FIG. 6 illustrates a block diagram of car electronics.

FIG. 6 illustrates the principle alternative construction of the antenna module AM in which only one fixedly installed directional antenna 61 is used. The directional antenna 61 in this disclosed embodiment is a Yagi-antenna. The beam radiated by the Yagi-antenna is reflected at a rotatable reflector 62. Such reflector could be a plain plate made of metal. To the alternative such reflector may have a different shape. The beam will be directed down to the road surface A1. The beam steering is done by rotating the reflector by a certain amount. This type of construction may also be used for the embodiment depicted in FIG. 4 to lift the beam up in vertical direction where the beam however will not be reflected.

Figure 7:
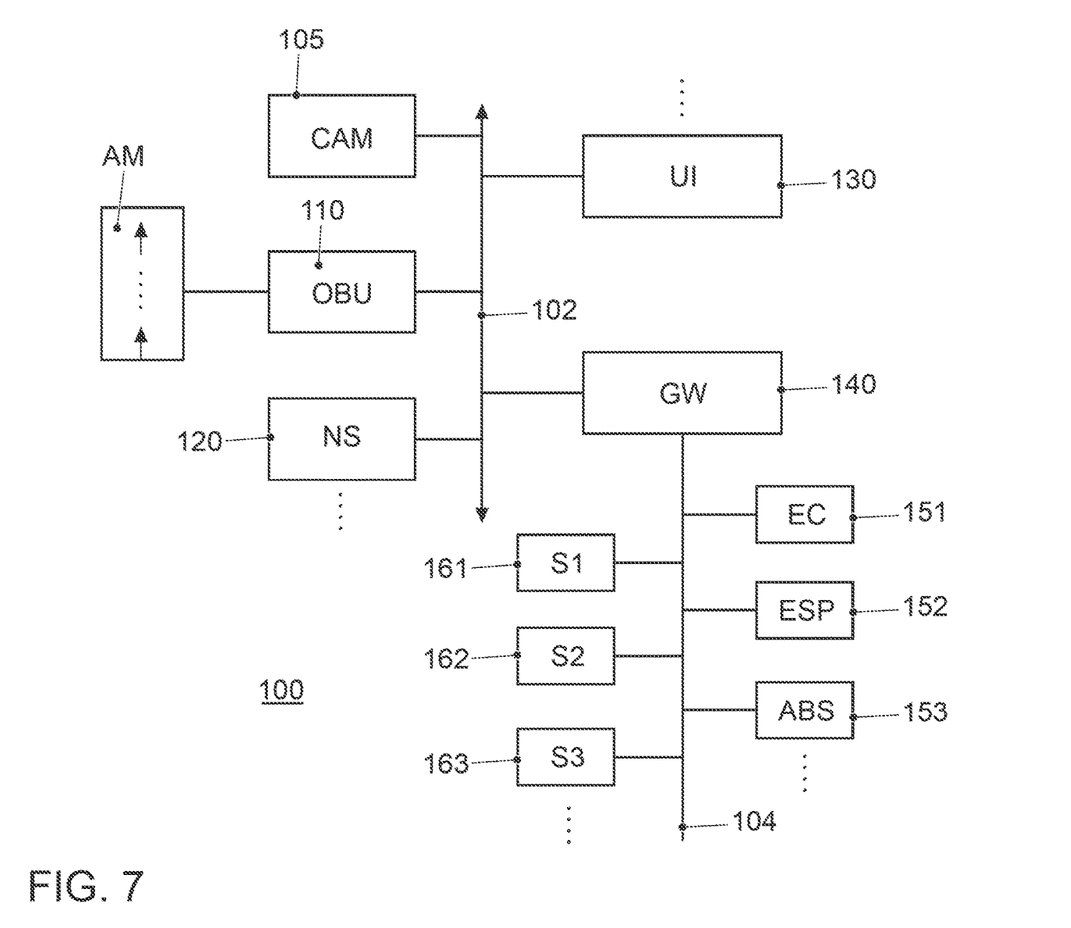
FIG. 7 illustrates an example of a construction of an antenna module for the embodiment depicted in FIG. 5.

FIG. 7 illustrates an exemplary block diagram of car electronics. With reference number 151 an engine control unit is referred. Reference number 152 denotes an anti-slippery control unit and reference number 153 a braking control unit. Further controllers like transmission control, airbag control etc. are normally available in the car. The linking of such control devices is typically done with the CAN bus system (Controller Area Network) 104 which is standardized as ISO standard, ISO 11898. As various sensors are installed in the vehicle and they are no longer connected only to individual control units, such sensor data is also transmitted via the bus system 104 to the individual control devices. Examples of sensors in the vehicle are wheel speed sensors, steering angle sensors, accelerometers, gyroscopes, tire pressure sensors, proximity sensors, etc. The various sensors, with which the vehicle is equipped, are identified in FIG. 7 by the reference numerals 161, 162, 163.

The modern motor vehicle can also contain further components such as video cameras, for example, as a rear camera, or as a driver monitoring camera and a Radar device or Lidar device for the realization of a radar cruise control or for realizing a distance—or collision warning device.

The motor vehicle may be further equipped with other electronic devices. These are more arranged in the region of the passenger cell and are often operated by the driver. Examples are a user interface device with which the driver selects drive modes, but can also operate classical components. These include gear selection as well as turn signal control, windscreen wiper control, lighting control, etc. This user interface device is identified by the reference number 130. The user interface device 130 is often also equipped with a rotary/pressure switch, with which the driver can select different menus that are displayed on a display in the cockpit. On the other hand, a touch-sensitive display falls into this category, too. Even the voice control for the operator support falls within this range.

Distinguished therefrom is often a navigation system 120, which is also installed in the cockpit area. The position information used in the subject application will be made available by the navigation system 120. Other components, such as a speakerphone may be present but are not shown in detail. Reference numeral 110 denotes an on-board unit. This on-board unit 110 corresponds to a communication module by which the vehicle can receive and send mobile data. In this disclosure, it may be a WLAN p communication modules mentioned before. With the on-board unit 110, the antenna module AM is connected.

The devices of the passenger compartment are also linked to each other via a bus system, which is referred to by the reference numeral 102. This bus system may, for example, be the high-speed CAN bus system according to ISO 11898-2 standard act, but here in the variation for data transmission with higher data rate between infotainment devices. For the purpose to submit the vehicle-relevant sensor data from the communication interface 110 to another vehicle or to a central computer, the gateway 140 is provided. This is connected to the two different bus systems 102 and 104. The gateway is designed to convert the data that it receives via the CAN bus 104 into the transmission format of the CAN bus 102 so that they can be distributed in the there specified packages. For the forwarding of this data to an external device i.e., to another car or to a central computer, the on-board unit 110 is equipped with communication interface to receive these data packets and in turn put into the transmission format of a mobile phone standards accordingly employed.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

REFERENCE SIGN LIST

10 $4^{th}$ Vehicle
20 $1^{st}$ Vehicle
30 $2^{nd}$ Vehicle
40 $3^{rd}$ Vehicle
50 $5^{th}$ Vehicle
A1 Road
SRR Signal Range Rear Direction
SRP Sufficient Perception Signal Range Front Direction
SRI Signal Range Front Direction
DD Driving Direction
AM Antenna Module
$d_1$ Distance 1 d$_2$ Distance 2
Θ$_1$ Beamsteering Angle
61 Directional Antenna
62 Rotatable Reflector
100 Block Diagram Car Electronics
102 Infotainment CAN-Bus
104 CAN-Bus
110 On-Board Unit
120 Navigation System
130 User Interface
140 Gateway
151 Engine Control Unit
152 ESP Control Unit
153 Brake Control Unit
161 Sensor 1
162 Sensor 2
163 Sensor 3

The invention claimed is:

1. A method for adjusting the interference level for a wireless communication from a first mobile station to a second mobile station, wherein the interference is caused by the wireless communication from the first mobile station in parallel with the wireless communication from a third mobile station, the method performed by the first mobile station comprising:
   detecting an interference level, wherein the first, second and third mobile stations are vehicles moving on a road in the same direction and the vehicles being equipped with a wireless communication module, wherein the second vehicle is moving in front of the first vehicle and the third vehicle is moving in front of the second vehicle;
   elevating the direction of beam for the signal transmissions from the first mobile station to the second mobile station relative to a first angle between the ground level and the current direction of beam to develop an additional degree of freedom based on the reflection for the transmissions from the first mobile station to the second mobile station,
   wherein a distance between the first mobile station and whereat ground reflection occurs is varied to change a signal energy and dynamically adjust the interference level; and
   controlling the distance between the first mobile station and whereat ground reflection occurs to enable a beam direction adjustment by a second angle towards a vertical direction of transmission for transmission distances between the first mobile station and the second mobile station that vary in longitudinal and lateral directions.

2. The method of claim 1, wherein the direction of beam is steered downward to the road surface so that, due to the reflection of the beam at the road surface, the direction of beam is indirectly elevated.

3. The method of claim 1, wherein the interference level is detected as part of a Carrier Sense Multiple Access and Collision Avoidance (CSMA/CA) technique during wireless network arbitration.

4. The method of claim 1, wherein the presence of a third mobile station is detected by the exchange of cooperative awareness messages between at least two of the first, second, and third vehicles.

5. The method of claim 4, wherein the cooperative awareness messages include the position of the vehicle sending out the cooperative awareness message.

6. The method of claim 1, wherein the presence of a third vehicle is detected by a sensor with which the first vehicle is equipped.

7. The method of claim 1, wherein the presence of a third vehicle is detected by a sensor with which the second vehicle is equipped and wherein the recognition of the third vehicle is communicated to the first vehicle.

8. A mobile station, comprising:
   a radio communication module for transmitting messages from the first mobile station to a second mobile station and for receiving messages from the second mobile station or from a third mobile station; and
   at least one directional antenna for sending out a beam towards the second mobile station,
   wherein the mobile station elevates the direction of beam for the signal transmissions from the mobile station to the second mobile station relative to a first angle between the ground level and the current direction of beam to develop an additional degree of freedom based on the reflection for the transmissions from the first mobile station to the second mobile station,
   wherein the method comprises detection of an interference level, wherein the first, second and third mobile stations are vehicles moving on a road in the same direction and the vehicles are equipped with a wireless communication module, wherein the second vehicle is moving in front of the first vehicle and the third vehicle is moving in front of the second vehicle,
   wherein a distance between the first mobile station and whereat ground reflection occurs is varied to change a signal energy and dynamically adjust the interference level according to the signal energy,
   wherein control of the distance between the first mobile station and whereat ground reflection occurs enables a beam direction adjustment by a second angle towards a vertical direction of transmission for transmission distances varying in longitudinal and lateral directions,
   wherein the mobile station elevates the direction of beam for the signal transmissions to adjust the interference level for wireless communication between the first mobile station and the second mobile station,
   wherein the interference is caused by the wireless communication from the first mobile station in parallel with the wireless communication from the third mobile station and the control of the distance between the first mobile station and whereat ground reflection occurs mitigates the interference caused by the third mobile station.

9. The mobile station of claim 8, further comprising:
   a multi antenna array,
   wherein the elevation of the direction of beam is performed with the help of a beamforming or beamsteering technique.

10. The mobile station of claim 8, further comprising means for elevating the directional antenna for the elevation of the direction of beam.

11. The mobile station of claim 8, further comprising a movable reflection means, wherein the movable reflection means are adjusted so the direction of beam is elevated.

12. The mobile station of claim 8, further comprising means for performing the elevation of the direction of beam indirectly so the direction of beam is turned down towards the ground level so the beam will be reflected at the ground surface so the reflected beam will be directed with a higher angle between the ground level and the direction of beam compared to the current direction of beam.

13. The mobile station of claim 8, wherein the direction of beam is steered downward to the road surface so that, due to the reflection of the beam at the road surface, the direction of beam is indirectly elevated.

14. The mobile station of claim 8, wherein the interference level is detected as part of a Carrier Sense Multiple Access and Collision Avoidance (CSMA/CA) technique during wireless network arbitration.

15. The mobile station of claim 8, wherein the presence of the third mobile station is detected by the exchange of cooperative awareness messages between at least two of the first, second, and third vehicles.

16. The mobile station of claim 15, wherein the cooperative awareness messages include the position of the vehicle sending out the cooperative awareness message.

17. The mobile station of claim 8, wherein the presence of the third vehicle is detected by a sensor with which the first vehicle is equipped.

18. The mobile station of claim 8, wherein the presence of the third vehicle is detected by a sensor with which the second vehicle is equipped and wherein the recognition of the third vehicle is communicated to the first vehicle.

19. The mobile station of claim 8, wherein the mobile station is disposed at at least one of the first, second, and third vehicles.

* * * * *